Feb. 12, 1924.
C. B. THOMAS
1,483,698
AUTOMOBILE RIM SECURING MEANS
Filed Feb. 24, 1923  2 Sheets-Sheet 1
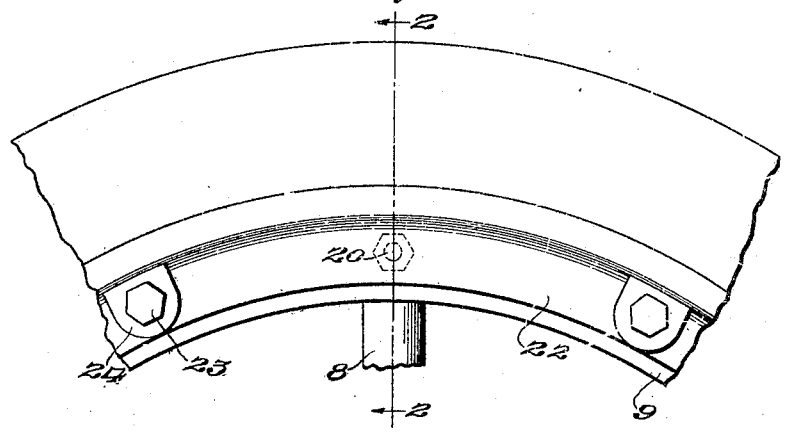
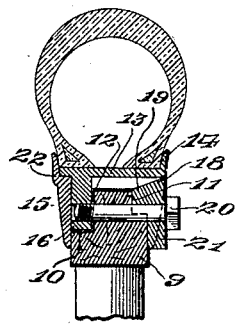
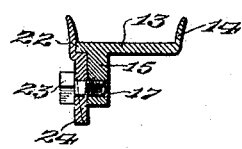 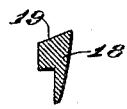
Inventor
Charles B Thomas Feb. 12, 1924.

C. B. THOMAS 1,483,698

AUTOMOBILE RIM SECURING MEANS

Filed Feb. 24, 1923      2 Sheets-Sheet 2

Inventor
Charles B. Thomas

Patented Feb. 12, 1924.

1,483,698

UNITED STATES PATENT OFFICE.

CHARLES B. THOMAS, OF ALTO, TEXAS, ASSIGNOR OF ONE-HALF TO WILLIAM BLANTON, OF ALTO, TEXAS.

AUTOMOBILE RIM-SECURING MEANS.

Application filed February 24, 1923. Serial No. 620,977.

*To all whom it may concern:*

Be it known that CHARLES B. THOMAS, a citizen of the United States, residing at Alto, in the county of Cherokee and State of Texas, has invented certain new and useful Improvements in Automobile Rim-Securing Means, of which the following is a specification.

The present invention relates to rims and is especially desirable for use with pneumatic tires on the wheels of motor vehicles.

An object of the invention is to provide a demountable rim which is characterized by durability yet one which permits the expeditious removal of the tire and likewise facile and expeditious replacement of the same.

A further object of the invention is to provide a demountable rim which is detachably engaged with the felly of the wheel in a manner which prevents frictional engagement of the rim with the felly thereby permitting the rim to be readily removed from the felly when desired.

The above and other objects of this invention will be apparent from the following description taken in connection with the accompanying drawings wherein:—

Fig. 1 is a fragmentary side elevational view of a wheel embodying this invention;

Fig. 2 is a sectional view taken on the line 2—2 of Fig. 1 looking in the direction of the arrows;

Fig. 3 is a transverse sectional view taken through the tire rim and clamping ring;

Fig. 4 is a transverse sectional view of a bearing ring used in the present invention;

Figure 5:
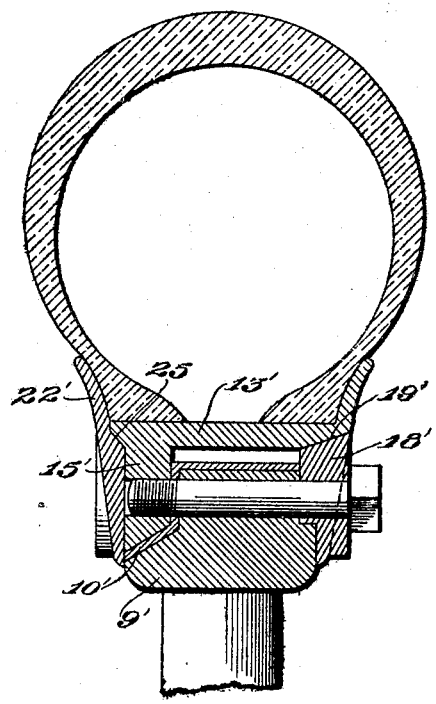
Fig. 5 is a transverse sectional view of a modified form of demountable rim illustrating its application.

In the drawings a wheel 8 is shown which may be of standard configuration except that the felly 9 thereof is provided with a recess or groove 10 in the outer wall thereof while a recess or groove 11 is formed on the inner wall of the felly. The groove 11 is relatively shallower than the groove 10. By preference, the felly is equipped with a wear plate 12 which extends downwardly into the groove 10 and around the periphery of the felly.

Mounted on the felly 9 but spaced therefrom is a tire rim 13 the inner lateral margin of which is bent upwardly at right angles to provide a tire holding flange 14. An annular rib 15 is formed on the inner periphery of the rim 13 adjacent the outer margin of the rim and is adapted for engagement in the groove 10 as shown in Fig. 2. The rib is provided with a series of screw-threaded recesses or openings such as shown at 16 in Fig. 2 and at 17 in Fig. 3 for a purpose hereinafter set forth. It will be noted that the rib 15 is appreciably wider than the depth of the recess 10 so as to space the rim 13 from the outer periphery of the felly 9.

In order to retain the rim 13 spaced from the felly a bearing ring 18 is provided the outer periphery of which is beveled as shown at 19. Upon reference to Fig. 2 of the drawings, it will be apparent that the inner terminus of the beveled face of the bearing ring is coincident with the outer periphery of the wear plate 12. Consequently, the tire rim 13 may be first mounted on the outer periphery of the felly 9 after which the exertion of pressure thereon inwardly will cause the rim to ride upwardly on the beveled periphery 19 into the position shown in Fig. 2.

In order to secure the bearing ring 18 and rim 13 to the felly, bolts 20 are provided each of which extends through an opening 21 formed in the bearing ring and transversely through the felly 9 into engagement with the wall of a recess 16 formed in the annular rib 15 of the tire rim. The heads of the bolts extend on the inside of the wheel while the opposite ends are concealed by a clamping ring 22. The said clamping ring is engaged with the outer face of the wheel felly 9 and complements the rib 15 and outer margin of the rim 13 as illustrated to advantage in Fig. 3. The clamping ring is detachably connected to the annular rib 15, by means of bolts 23, which extend through bosses 24 formed on the outer face of the clamping ring and engaged with the threaded walls of the openings 17.

Figure 6:
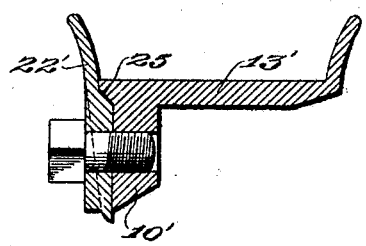
Fig. 6 is a transverse sectional view of the tire rim and clamping ring shown in Fig. 5.
Figure 7:
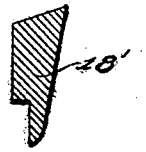
Fig. 7 is a transverse sectional view of the bearing ring shown in Fig. 5.

In Figs 5, 6 and 7 a slightly modified form is shown consisting especially in providing a wider bearing ring 18' the beveled periphery 19' of which extends appreciably beyond the outer periphery of the felly 9'. Moreover, in the modified form of invention shown in Figs. 5, 6 and 7 the tire rim 13' has a portion of its inner periphery undercut to complement the beveled face 19' of the bearing ring. Moreover, the felly 9' has the groove 10' thereof beveled for engagement with the complementally formed inner periphery of the rib 15'. Also, the clamping ring 22' has a portion of its inner face obliquely offset, as indicated at 25 for engagement with a corresponding portion of the tire rim 13' outside of the rib 15'.

The above construction permits the tire to be expeditiously removed by simply disengaging the bolts 23 so as to permit removal of the clamping ring. When it is desired to remove the tire rim the bolts 20 are disengaged thereby permitting removal of the tire rim without difficulty since in either form of the invention herein shown the tire rim is positively held in spaced relation to the felly of the wheel at all times.

Various changes may be made in this device within the scope of the appended claims.

What is claimed is:—

1. In combination a felly provided at each side with a groove, a rim surrounding and spaced from said felly and having an inwardly extending flange projecting into one of said grooves, a bearing ring projecting from the felly and engaging the inner face of the rim, said ring extending into the other of said grooves, and said flange and ring adapted to be connected to said felly for securing the rim therewith.

2. In combination a felly provided at each side with a groove, a rim surrounding and spaced from said felly and having an inwardly extending flange projecting into one of said grooves, a bearing ring projecting from the felly and engaging the inner face of the rim, said ring extending into the other of said grooves, and securing devices extending through said ring and felly and engaging in said flange for securing said rim to the felly.

In testimony whereof I affix my signature.

CHARLES B. THOMAS.